United States Patent [19]

Hunt

[11] 3,713,223
[45] Jan. 30, 1973

[54] AUTOMATIC SCRIBING MACHINE

[75] Inventor: Robert A. Hunt, Silver Creek, N.Y.

[73] Assignee: F. M. Biggar, Jr., Hamburg, N.Y.

[22] Filed: Dec. 29, 1971

[21] Appl. No.: 213,514

[52] U.S. Cl. ................................. 33/24 C
[51] Int. Cl. ............................... B43l 13/10
[58] Field of Search ........................... 33/24 R, 24 C

[56] References Cited

UNITED STATES PATENTS 3,282,442    11/1966    Biggley et al. .................. 33/24 C

FOREIGN PATENTS OR APPLICATIONS 984,941    3/1951    France ........................ 33/24 C
473,240    5/1951    Canada ....................... 33/24 R

*Primary Examiner*—Harry N. Haroian
*Attorney*—John P. Snyder et al.

[57] ABSTRACT

A pair of carriages are movable in mutually orthogonal directions and include guides which cross or intersect and which extend perpendicular to the directions of carriage movements. The guides overlie a table upon which a pattern is placed and a manually movable targeting member slidably engages the guides at their intersection and carries a window having a cross hair sight. In moving the targeting member so that the cross hairs align with a desired point on the pattern, the guides and carriages are moved. Another table is disposed below the pattern table and upon which the plate to be scribed is positioned. Tractors are provided, one of which is movable in the direction of one carriage and carries a track projecting perpendicular to such direction. The other tractor is movable along the track and carries a retractable stylus. A joy stick control switch is provided on the targeting device to cause either one of the tractors to move in one direction only and the tractors include switches which are operated according to the locations of the guides to stop tractor movement. xhe tractor switches effect reverse motion of the tractors if the guides overrun the tractors. Precise positioning of the tractors is effected by toothed latch bars which have a number of sets of teeth, each set having a different pitch.

7 Claims, 9 Drawing Figures

PATENTED JAN 30 1973

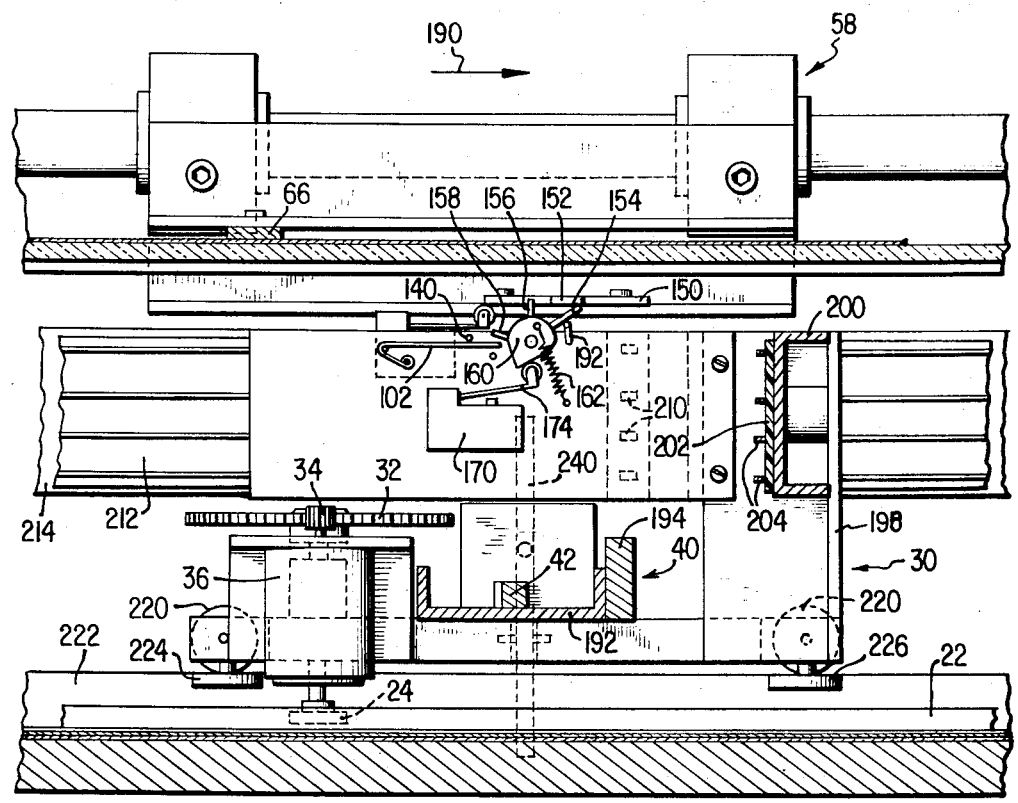
FIG. 6
FIG. 7
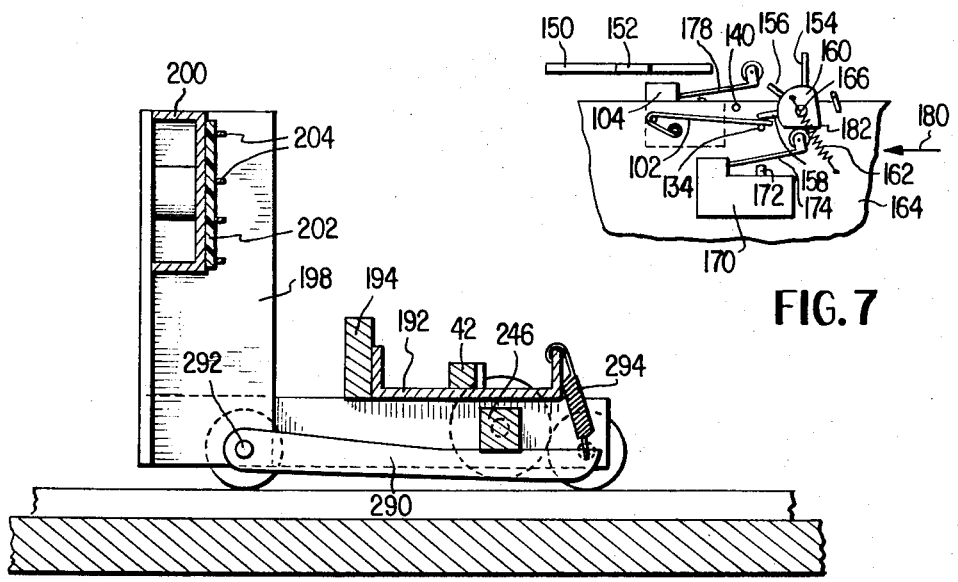
FIG. 8

AUTOMATIC SCRIBING MACHINE

BACKGROUND OF THE INVENTION

In the graphic arts, it is frequently necessary to provide a printing plate having a format or pattern thereon which conforms accurately to desired dimensions. An example is encountered in the making of printing plates for printing upon computer paper wherein the computer paper has horizontal and vertical line spacings with which the format must be accurately aligned.

At the present time, skilled operators are required accurately to scribe, by hand, lines through the etchant resistant coating on a printing plate, such line having the proper weight and the format formed by and within the scribed lines being accurately dimensioned and positioned so that the plate when completed will print accurately upon the computer paper.

BRIEF SUMMARY OF THE INVENTION

The present invention is directed to a machine wherein scribing as above described is achieved automatically and with accuracy so as to dispense with the need for skilled operators to effect the laying out of formats as described above.

Generally speaking, the present invention involves the use of orthogonally crossing guides which overlie an upper table upon which the master pattern is placed, the guides being coupled together at their point of crossing by means of a manually movable member which carries cross hairs or a siting point which may be brought into alignment with a desired or selected point on the master pattern. In combination with this arrangement, there is provided a lower table upon which the printing plate in preparation is placed.

A first tractor is movable back and forth along a path parallel to one of the guides and it carries a track which is perpendicular to such movement and is therefore parallel to the other guide. A second tractor is movable back and forth along the track and it carries a stylus which may be moved selectively into and out of engagement with the printing plate under preparation, the track overlying the region of the second or lower table which carries the printing plate under preparation.

The tractors are slaved to movements of the guides in one direction so that the tractors always automatically return to a predetermined relative position with respect to the guides. When the guides are moved in the opposite sense, however, no automatic slaving motion of the tractors is effected. Instead, the tractors are under manual switch controls such as either to move from the aforesaid relative predetermined position in a direction parallel to the one guide or in a direction parallel to the other guide. When the tractors are under control of the manual switch means, automatic switch means stops the tractors in the proper coordinate positions corresponding to the location of the stylus at the desired point corresponding to the siting point of the targeting means.

Additionally, provision is made for slowing down the drive motors for each of the tractors as the tractors approach the coordinate positions as aforesaid under control of the manual switch means.

Still further, toothed latch bars are associated with each tractor and an automatically operable latch is engagable with a corresponding latch bar positively to position the tractor at the coordinate position of the stylus. The latch bars are provided with plural sets of teeth, each set having a different pitch corresponding to different line spacings of the computer paper upon which the format is to be printed and these sets of teeth are selectively positionable for cooperation with the latches.

BRIEF DESCRIPTION OF THE DRAWING FIGURES

FIG. 6 is a transverse vertical section taken substantially along the plane of section line 6—6 in FIG. 5;

FIG. 7 is a partial elevational view showing certain details of the switch mechanism;

FIG. 8 is a vertical section taken substantially along the plane of section line 8—8 in FIG. 5.

DETAILED DESCRIPTION OF THE INVENTION

Figure 5:
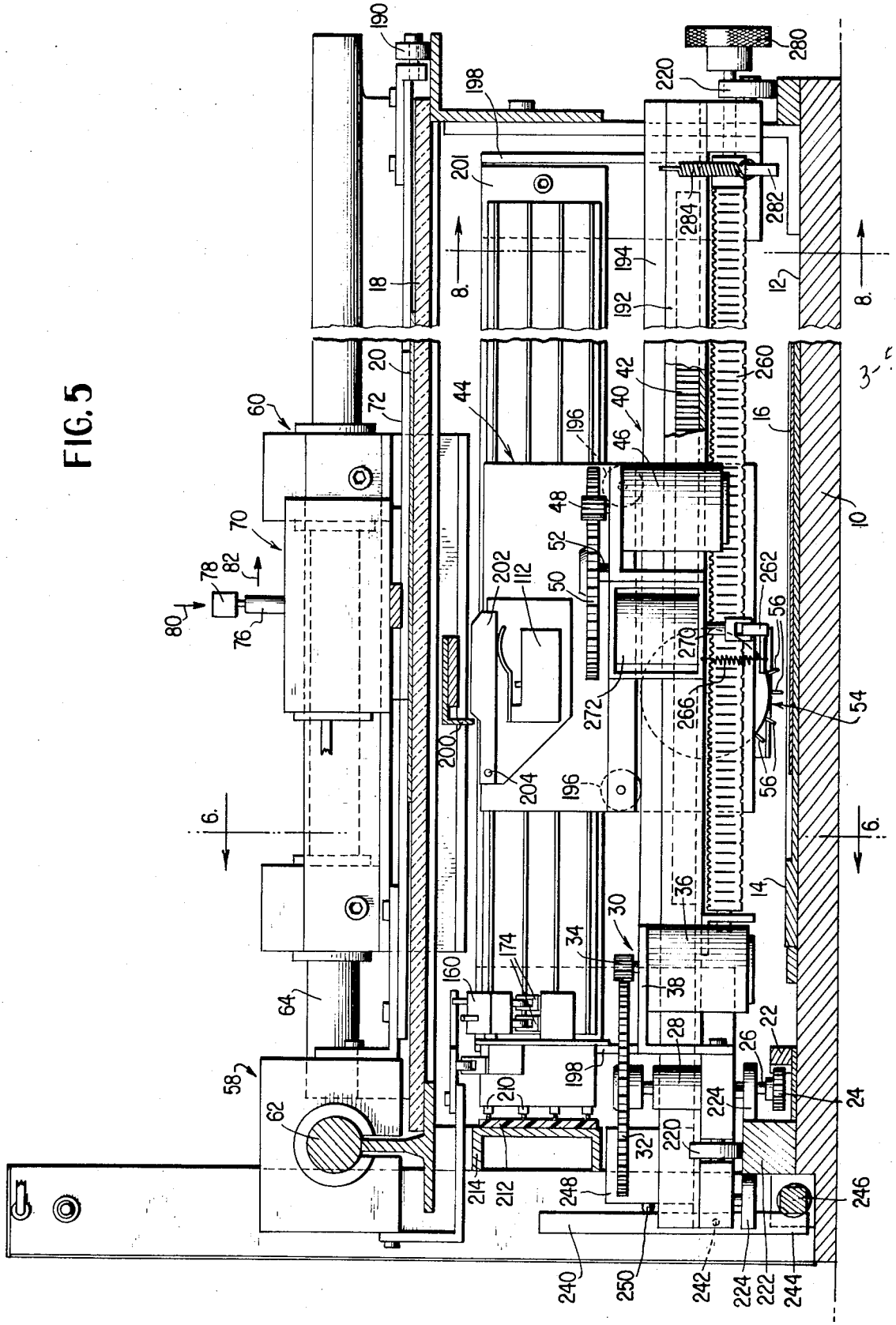
FIG. 5 is an enlarged vertical section taken substantially along the plane of section line 5—5 in FIG. 1.

With reference now more particularly to FIG. 5 the machine consists essentially of a frame composed of various structural members hereinafter more particularly pointed out but which may include a base indicated by the reference character 10 and which may, as shown, provide an upper platform or table 12 upon which is placed a frame 14 carrying a printing plate 16 in preparation, it being appreciated that the printing plate 16 is disposed in predetermined fixed relationship with respect to the lower table 12, as will hereinafter become apparent. The frame of the machine supports an upper table 18 which, in the instance shown, is a transparent sheet of glass or the like and upon this upper table there is placed a master pattern member 20, also in predetermined fixed relationship thereto and bearing a predetermined fixed relationship to the printing member 16, all as will hereinafter be apparent.

Associated with the lower table or platform 12 there is an elongate rack 22 having a pinion 24 in mesh therewith, the pinion being carried by a shaft 26 suitably journalled as at 28 and carried by the frame of a tractor means indicated generally by the reference character 30. The upper end of the shaft 26 carries a gear 32 which in turn is in mesh with the pinion gear 34 driven by a motor 36 which is mounted on the horizontal leg 38 of the tractor means frame. The tractor means 30 moves into and out of the page as shown in FIG. 5 and this tractor means includes a track member indicated generally by the reference character 40 which projects perpendicular to the direction of movement of such tractor means 30, as shown, and which overlies the the lower table 12 and, in particular, the printing plate member 16 positioned thereon.

The track 40 carries a second rack 42 and operatively associated with this second rack 42 is a second tractor means indicated generally by the reference character 44. In particular, the motor 46 of the second tractor means drives a pinion 48 which is in mesh with the gear 50, the pinion 48 and gear 50 corresponding to the pinion 34 and gear 32 described in conjunction with the first mentioned tractor means. The gear 50 is mounted at the upper end of a shaft 52, the lower end of which carries a pinion engaging the rack 42. Thus, the second tractor means 44 is movable back and forth, left to right in FIG. 5 perpendicular or orthogonal to the direction of movement of the first mentioned tractor means 30. Mounted on the frame of the second tractor means 44 is a stylus means indicated generally by the reference character 54 which carries a plurality of individual stylii 56, one of which is selected for operation (i.e. the vertically disposed stylus in FIG. 5) dependent upon the weight of line to be scribed on the printing plate member 16. As will hereinafter appear, the stylus means 54 is movable vertically into and out of engagement with the printing plate 16, the stylus means normally being out of engagement therewith as will hereinafter appear.

Figure 1:
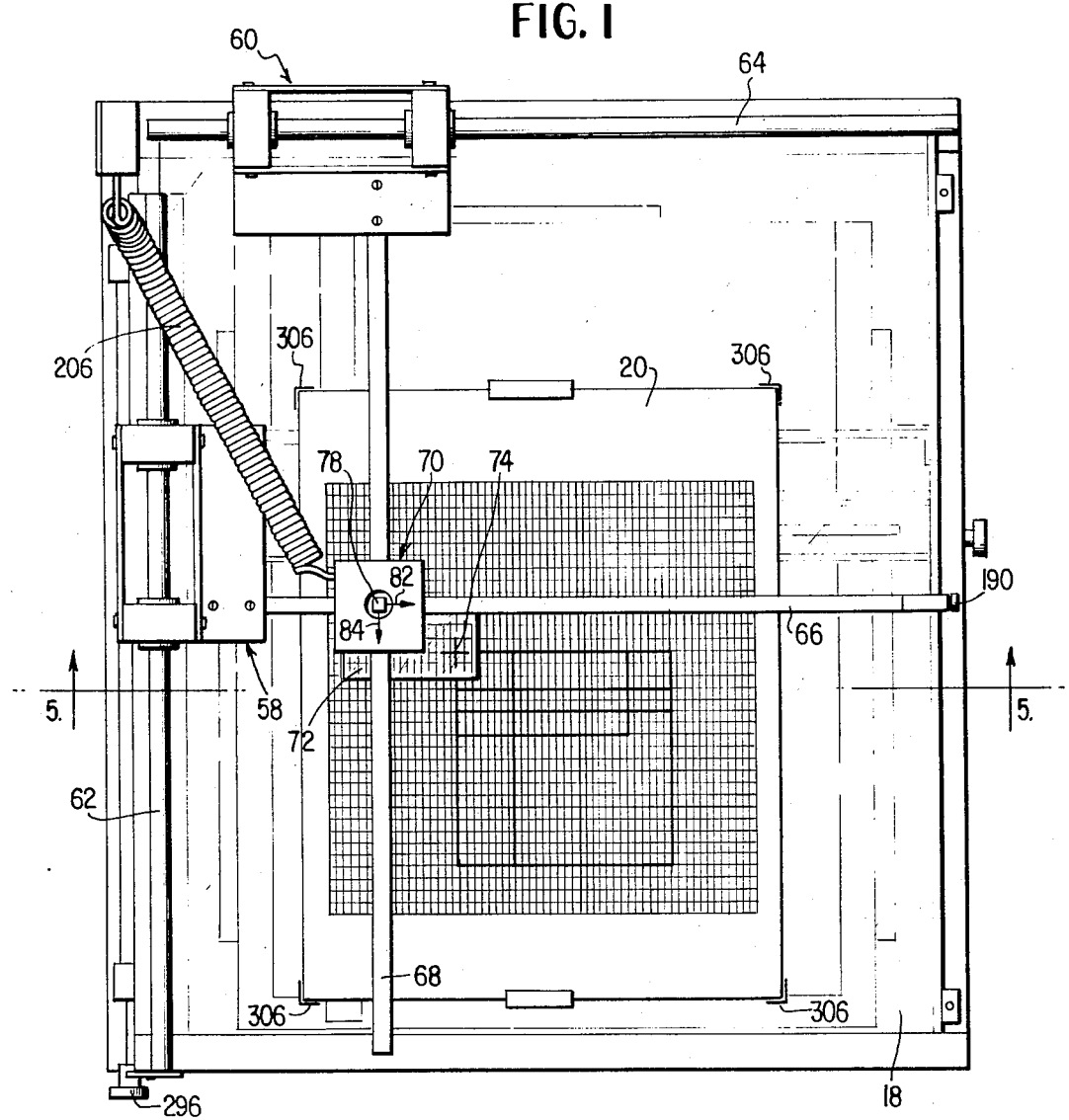
FIG. 1 is a top plan view of a machine according to the present invention.
Figure 2:
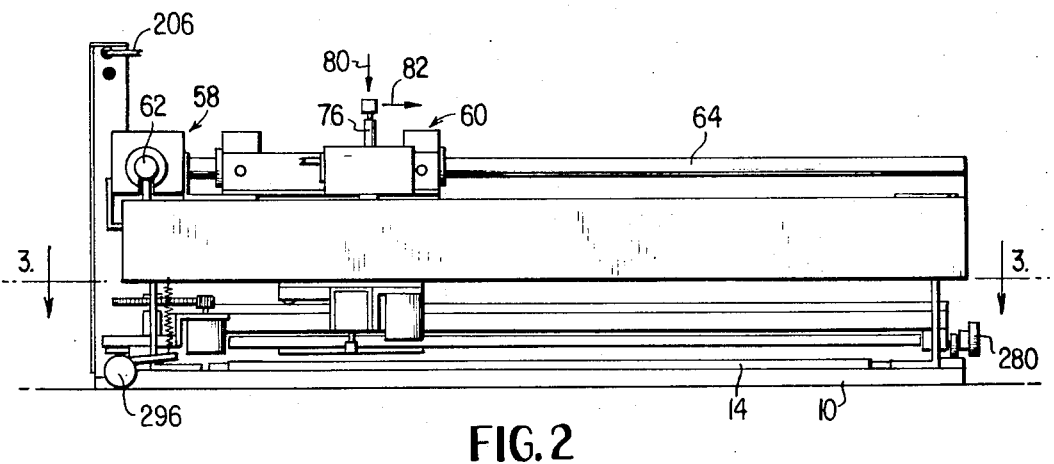
FIG. 2 is a side elevation view of the machine shown in FIG. 1.

Associated with the upper plate, as can be seen in FIG. 1, first and second carriage means are provided, as indicated by the reference characters 58 and 60. The first carriage means 58 is slidable longitudinally of an elongate guide bar 62 rigidly affixed to the frame of the machine and there is likewise provided an elongate guide bar 64 rigidly attached to the frame of the machine along which the second carriage means 60 is longitudinally slidable, as will be readily appreciated. The first carriage means or guide means 58 operates to move back and forth along a path parallel to the path along which the first tractor means 30 moves whereas the second carriage means 60 is arranged to move back and forth along a direction perpendicular thereto or more particularly back and forth in a direction parallel to the direction of movement along which the second tractor means 44 is allowed to move. Thus, both the carriage means and the tractor means are adapted to move in mutually orthogonal directions and the movements of the two systems are accurately aligned as aforesaid.

The first carriage means 58 includes an elongate guide 66 which extends perpendicular to the direction of the guide bar 62 and overlies the upper table 18 as shown whereas the second carriage means 60 also includes a guide 68 which is perpendicular to the axis of the guide bar 64 and which also overlies the upper table 18 and, thereby, crosses the guide 66. A targeting means indicated generally by the reference character 70 slidably engages both the guide 66 and the guide 68 at their crossing points and is manually movable to any desired position with respect to the master pattern 20 so as to cause corresponding movements of the carriage means 58 and 60 as will be readily apparent. The targeting means 70 includes a window 72 having a site or cross hairs 74 so that the targeting means may be accurately aligned with a desired point on the master pattern member 20. The master pattern 20 as shown in FIG. 1 contains vertical and horizontal lines corresponding to a computer paper standard format and, within this format there is provided the various lines as shown in the dark or heavy line portions in FIG. 1 which is desired to be printed upon the computer paper in an accurately dimensioned and positioned relationship. It is the pattern of these heavy lines in FIG. 1 that is desired to be scribed on the printing plate member 16 in FIG. 5 by the stylus means 54.

The targeting means 70 mounts a joystick control 76, see particularly FIG. 5 and a depressable thumb switch button 78, the latter of which is depressable as indicated by the arrow 80. The joystick control 76 is movable in either one of the directions as indicated by the arrows 82 and 84 in FIG. 1 correspondingly to control operation of the tractor means 30 and 44. Before proceeding further with detailed description of the mechanical aspects of the present invention, reference is had at this time to FIG. 9 wherein the general principles of operation will be apparent.

Figure 9:
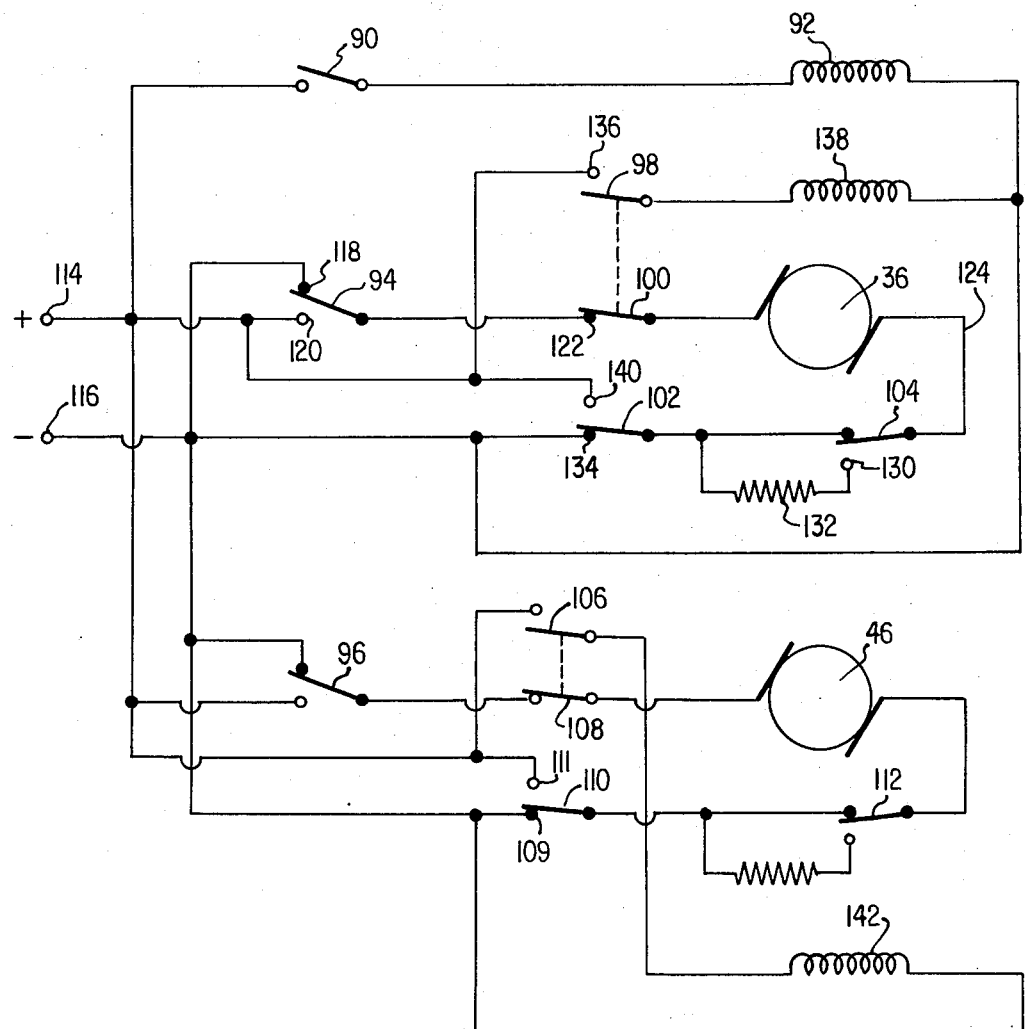
FIG. 9 is a wiring diagram illustrating certain principles of operation of the present machine.

In FIG. 9, the switch operated by the thumb button 78 is indicated by the reference character 90 and is operative, when depressed, to energize the winding 92 which controls operation of the stylus means 54. The switch controlled by the joystick 76 when same is moved in the direction of the arrow 84 is indicated by the reference character 94 and is operative to control operation of the motor 36 as hereinafter described. Likewise, the joystick switch which is operated when same is moved in the direction of the arrow 82 is indicated by the reference character 96 and same controls operation of the motor 46 within the constraints hereinafter described.

There are four automatically controlled switches associated with each motor 36 and 46, those associated with motor 36 are indicated in FIG. 9 by the reference character 98, 100, 102, and 104 whereas those associated with the motor 46 are indicated by reference characters 106, 108, 110 and 112. As shown, the power input terminals which are ± terminals are indicated by the reference characters 114 and 116 and are connected directly to several of the switches. For instance, the switch 94 includes a contact 118 which is directly connected to the minus terminal 116 and a contact 120 directly connected to the plus terminal 114 so that the movable contact of the switch 94 is energized from either one of these sources. The switch 94 is connected to the fixed contact 122 of the switch 100 whose movable contact is connected to one end of the winding of the motor 56. The return path for the winding of the motor 36 is through the conductor 124 and the switch 104 and, in series therewith, the switch 102. In the condition of the switches as shown in FIG. 9, it will be evident that both sides of the motor 36 are connected to the negative terminal 116 so that the motor will not be energized to move in either direction of rotation. In the event that the joystick control is actuated, however, such that the movable contact of the switch 94 engages the fixed contact 120, the motor 36 will be energized in one direction of rotation which is such as to cause the tractor means 30 to move in the direction of the arrow 84 in FIG. 1, under certain conditions as will be presently described. Assuming that the switches 98, 100 and 102 as well as the switch 104 are in the positions shown in FIG. 9 while the tractor means 30 is still moving, the tractor means 30, and the track 40 with it, will move downwardly in FIG. 1 until a condition is reached wherein first the switch 104 is operated such that its movable contact engages the fixed contact 130 which places the added resistance 132 in circuit with the motor 36 thereby to slow down its rate of rotation and thereby to slow the motion of the tract means 30. Subsequent to this, the switch 98, 100 and 102 are operated. When the switch 102 is actuated, its movable contact moves out of contact with the fixed contact 134 connected to the negative terminal 116 and simultaneously the movable contact of the switch 100 moves away from its fixed contact 122 so that now both sides of the circuit to the motor 36 are open. Simultaneously, the movable contact of the switch 98 engages the fixed contact 136 so that the winding 138 is energized. As will hereinafter appear, the winding 138 actuates a latch mechanism positively to arrest the motion of the tractor means 30 at the desired point. At this point in time, as will hereinafter appear more clearly, the two switches 98 and 100 have been moved to their full actuated positions whereby the movable contact of the switch 100 is away from the contact 122 and the movable contact of the switch 98 is in engagement with the fixed contact 136 whereas, at the same time, the movable contact of the switch 102 is not touching either of its fixed contacts 134 or 138. It is assumed, of course, that at this time the joystick is released so that the switch 94 returns to the position shown in FIG. 9.

A similar operation takes place for the control of the motor 46. It is appreciated, of course, that the winding 142 is the winding which actuates the latch means associated with the motor 46.

To appreciate better the operation of the switch means and the device according to the present invention, reference is had at this time to FIGS. 6 and 7 in conjunction with FIG. 9. In FIG. 6, it will be seen that the first carriage means 58 includes a switch camming plate 150 including a tang 152 cooperable with the several fingers 154, 156 and 158 of the rotatable camming member 160. The normal position of the assemblies are as is shown in FIG. 7 wherein the switch camming plate 150 and its associated tang 156 are positioned relatively to the switching cam 160 in the fashion indicated so that the spring 162 which is anchored at one end to the frame portion 164 of the tractor means 30 and at its other end on the member 160 is over center with respect to the pivot shaft 166 of the switch cam. This places the finger 154 in the upright position as shown with the shorter fingers 156 and 158 essentially at the angles shown so that the finger 156 will clear beneath the tang 152 as will be evident. However, the finger 154 will be in position to be struck and moved by the tang 152.

The frame portion 164 carries a switch body 170 which contains the two switches 98 and 100 in FIG. 9. The actuating button 172 of one of which is shown in FIG. 7 and there are two spring leaf actuators 174 cooperating with the switches (see particularly FIG. 5). The movable contact of the switch 102 is actuated by the finger 158 and the fixed contacts 134 and 140 are clearly shown in FIG. 7. Likewise, the actuator 178 of the switch 104 is shown in FIG. 7 and will be seen to be operated before the tang 152 reaches the upright finger 154 so that the sequence of operations are hereinbefore described are effected with respect to placing the additional resister 132 in circuit with the motor 36. As stated before, the initial position of the assembly is as shown in FIG. 7 and when the joystick switch 94 is actuated to move the tractor means 30 in the direction of the arrow 180 in FIG. 7, that is toward the carriage means 58 and the switch actuating plate 150 thereof, the switch actuator 178 will first be engaged to slow the motor down whereafter the tang 152 will contact the finger 154 and move the switch cam 160 to a position in which the toe 182 of the cam fully depresses both actuators 174 thereby to open the switch 100 and close the switch 98. At the same time, the finger 158 will have released the movable contact of the switch 102 sufficiently to permit it to disengage the fixed contact 134 but not sufficiently to engage the other fixed contacts 140. Thus, the switch 102 will be open at this time. Of course, the tractor means 30 will have stopped at this point since the motor 36 is disconnected and the latch means is operated to lock the tractor means in place at a fixed position relative to the guide or carriage means 58 corresponding to the coordinate position thereof and thereby locating the stylus means accurately along this coordinate. Thereafter, movement of the joystick control in the direction of the arrow 82 will effect a similar operation for the motor 46 of the other or second tractor means 44 so that the stylus means 54 ends up at the precise point corresponding to the target point under the cross hairs sites 74.

If, now, the carriage means 58 is moved in the direction of the arrow 190 in FIG. 6, the tang 152 will move the finger 154 further so that the spring 162 moves the camming block 1160 on the other side of center allowing the finger 154 to strike the stop 192 and, more importantly, allowing the finger 158 to permit the movable contact of the switch 102 to engage the fixed contact 140. As soon as this movable contact of the switch 102 has made contact with the fixed contact 140, the motor 36 will be energized to operate in the reverse direction, it being appreciated that the toe 182 of the cam has released the actuators 174 so that the latching switch 98 is opened and the switch 100 is closed. A similar action occurs in connection with the motor 46 excepting that in the case for the motor 46 and the corresponding tractor means 44, the camming element switches takes the form of an elongate angle member 200 fixed to and carried by the carriage means 60 as shown in FIG. 5, the vertically depending leg of which first engages the cam bar 202, pivoted at 204 to the frame of the tractor means 44 and which actuates the switch 112 to slow the motor 46 and thereafter, the operation is identical with that described in conjunction with FIGS. 6 and 7, see particularly FIG. 4 and the switch actuating block 206 for the several switches 106, 108 and 110 of FIG. 9.

Figure 4:
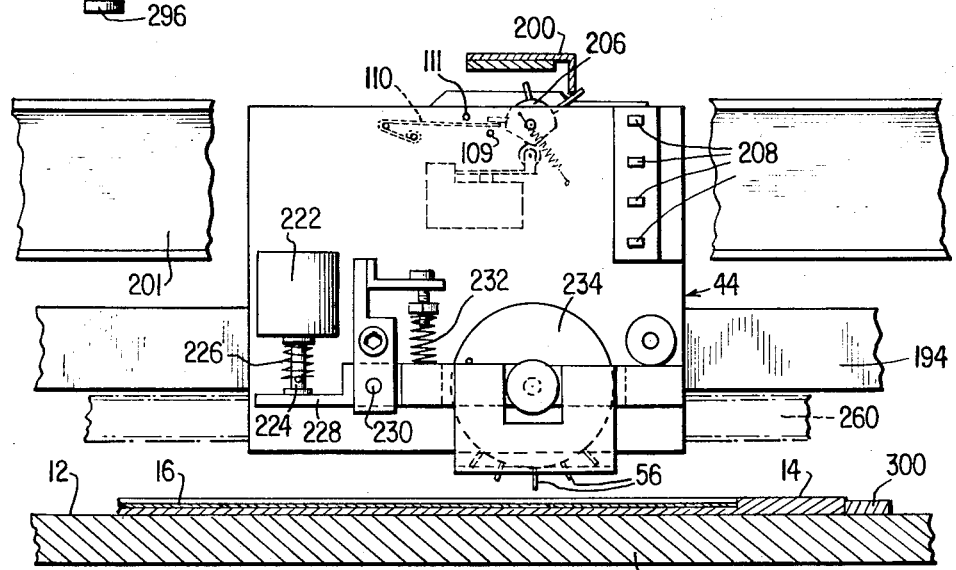
FIG. 4 is an enlarged elevational view, partly in section, illustrating details as indicated by section line 4—4 in FIG. 3.

FIG. 4 shows the position of the switching block 206 when the tractor means 44 has just reached the proper coordinate position and the circuit to the motor 46 is interrupted whereas the corresponding latch means is actuated.

As previously described in conjunction with FIG. 1, the two guide or carriage means 58 and 60 are firmly guided along their respective bars 62 and 64 and the guides 66 and 68 will be sufficiently rigid in a horizontal plane to prevent any deflection thereof such as might introduce inaccuracies in the operation of the device. At least one of the guides 66 or 68, and as is shown for the guide 66 in FIG. 1, is provided with an outboard roller or support means 190 which engages upon a fixed frame portion of the machine, see also FIG. 5 thereby lending rigidity and support for the target means 70.

The track 40 is also of rigid construction and preferably takes the form of elongate channel member 192 as indicated in FIG. 8 having a reinforcing and rigidifying guide rail 194 fixed thereto, the upper surface of which forms a supporting surface for wheel members 196 journalled on and carried by the frame of the tractor means 40 for obtaining vertical support thereof, see particularly FIG. 5. The opposite ends of the track carry uprights 198 between which a support member 200 is fixed and such support member carries a dielectric plate 202 having a number of electrically conductive rails 204 thereon suitably connected to the electrical energy source and to the switch means of the targeting device 70 through the electrical cable 206 so that the brushes 208 carried by the tractor means 44 may engage therewith to make the proper electrical connections. Similarly, the tractor means 30 carries a plurality of brushes 210 engagable with electrically conductive rails on a plate of dielectric material 212 carried by the support member 214 which is rigidly affixed to the frame of the machine. Lateral stability of the tractor means 44 is achieved by virtue of the wheels (not shown) engaging opposite sides of the rail 194.

A similar supporting arrangement for the tractor means 30 is provided, in the form of wheels 220 engaging the upper surface of the supporting rail 222 and in the form of pairs of wheels 224 and 226 engaging against the opposite side surfaces of such rail, see particularly FIGS. 5 and 6.

The outboard end of the track assembly 40 carries a suitable roller 220 supporting the outboard end thereof on a suitable rail portion of the frame of the machine, substantially as is shown in FIG. 5.

The winding 92 for actuating the stylus means is enclosed within a casing 222 as shown in FIG. 4 and drives an armature 224 to lift same against the action of the spring 226 and thereby release its normally downward-bearing pressure against the end 228 of a lever pivoted at 230 on the frame of the tractor means 44. The other side of the lever is normally urged downwardly under the action of the spring 232 which is, however, insufficiently strong to overcome the action of the spring 226 when the armature 224 bears downwardly against the end portion 228. When the armature is lifted, however, the weight of the stylus wheel 234 which is pivotally carried by the lever plus the action of the spring 232 rocks the lever downwardly so that the stylus which is in operative position engages with the requisite pressure to penetrate the film of material on the printing plate. As previously described, the operation of the winding 92 and thereby control of the stylus means is under control of the thumb switch 78 of the joystick control device.

The latching means for the tractor means 30 takes the form of a vertical latching bar 240 as shown in FIG. 5 which is pivoted at 242 to the frame of the tractor means 30 and which at its lower end 244 is adapted to engage with teeth on one side of the latch bar 246. Suitable spring biasing means (not shown) tends normally to retract the lower end 244 of the latch bar 240 from engagement between teeth of the member 246 and a solonoid or like device 248 mounted on the frame of the tractor means 30 is actuated by the switch 98, the winding being illustrated at 138 in FIG. 9, to cause the armature 250 to urge the bar 240 such that the lower end 244 of the bar engages the member 246. A generally similar situation prevails for the latching mechanism of the tractor means 44, same being illustrated in FIG. 8. In this instance, the toothed bar is indicated by reference character 260 and the latching member is indicated by the reference character 262, being pivoted at one end at 264 to the frame of the tractor means 44 and passing under the member 260. A spring 266 normally urges the latching member 262 into engagement with the member 260 but the spring urged armature 270 of the solonoid 272 whose winding is indicated at 142 in FIG. 9 normally depresses the member 262 so that it can engage the bar 260. When the winding 142 is energized, the spring action of the armature 270 is overcome to allow the bar 262 to latch into engagement between teeth of the member 260.

It is a particular feature of the present invention that each of the toothed members 246 and 260 are multi-faced and each face is provided with a series of teeth thereon, each series or set of teeth being of different pitch from the others and the various pitches corresponding to line spacings of standard computer paper. It is also a feature of this invention that the pitch of the teeth of a set may be utilized to compensate for stretching of the printing plate when it is operatively engaged with a printing cylinder and thereby to compensate therefore. In such instances, the pitches of the teeth will not be exactly in accord with the physical and actual dimensions of the line spacings of the standard computer paper.

Each of the members 246 and 260 may be rotated to place the requisite set of teeth in cooperation with respective bars 240 and 262. For example, as is shown in FIG. 5, a knob 280 is provided at the end of the member 260 so as to selectively rotate the same against the action of the positioning lever 282 which is normally urged by the spring 284 against the underside of the member 260 tending to prevent its rotation except as when overcome by turning of the knob 280. FIG. 8 shows a similar arrangement for the member 246, the member 290 being pivoted at 292 and spring urged at 294 normally to engage the under surface of the member 246 and prevent its rotation except when manipulated by the knob 296 as shown in FIG. 3.

Figure 3:
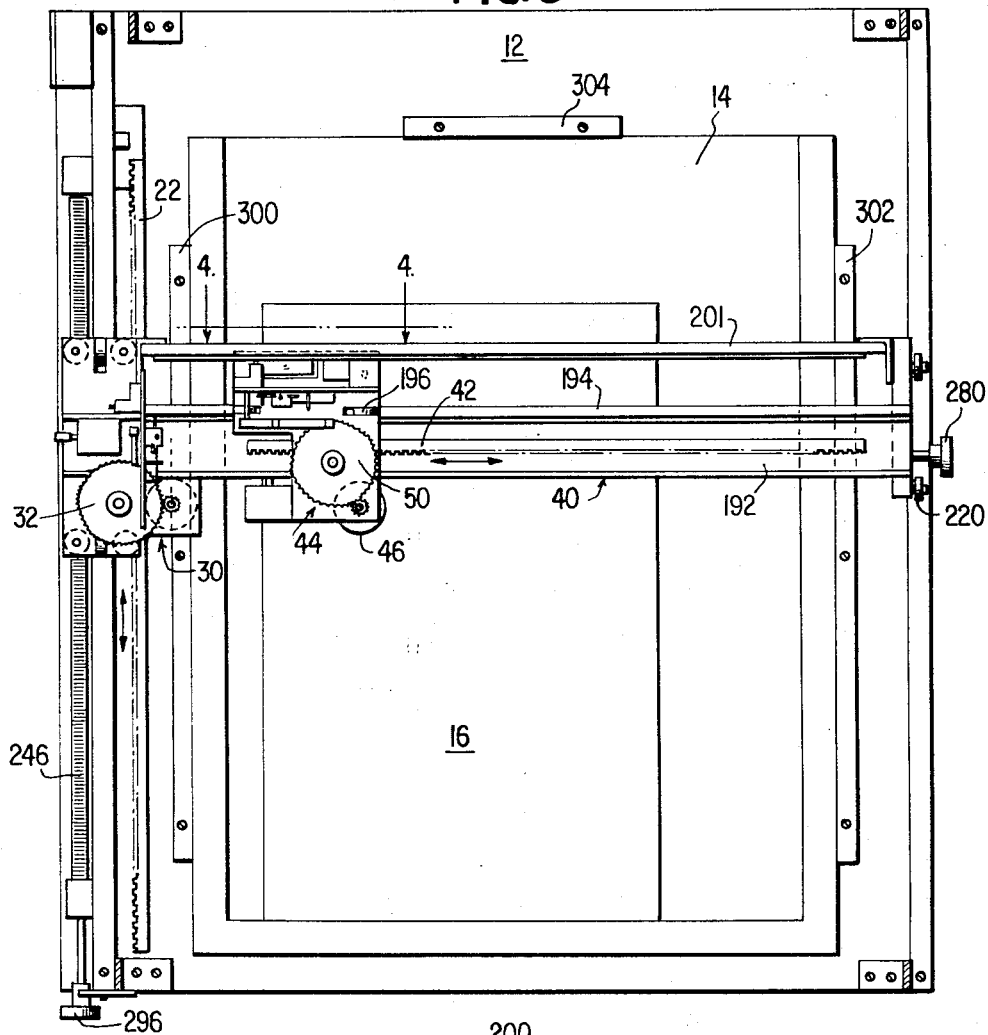
FIG. 3 is a horizontal section taken substantially along the plane of section 3—3 in FIG. 2 and showing details of the tractors and of the lower table.

To assure adequate and proper positioning of the printing plate, as is illustrated in FIG. 3, side guide members 300 and 302 and a stop guide 304 are provided for properly positioning the frame 14. Similarly, corner or edge marking indicia 306 may be provided on the top or upper table 18 as shown in FIG. 1 or positive stops or guides will be provided to locate the master pattern member 20.

In operation, it will be apparent that because of the current-reversing operation effected by the switches 102 and 110, the tractor means will tend always to return to the forth quadrant with respect to the siting point at the site 74 when either the guide means 66 is moved upwardly in FIG. 1 or the guide 68 is moved to the left in FIG. 1, in either case such as to actuate the switch camming block as previously described to achieve positions such as are shown in FIG. 6 of the drawing. Thus, for these movements of the guides 66 and 68, as effected by the manually operated target means 70, the tractors are slaved to the motions of the guides 66 and 68 which form part of the carriage or guide means 58 and 60. For the opposite direction of movements of the guides 66 and 68, however, no motion will occur with respect to the tractor means until the joystick control is actuated. Thus, the operator will first position the target or site 74 in a position such as is shown in FIG. 1 whereafter the joystick will be actuated to move the tractor means such that the stylus is at the coordinate point corresponding to the site point. Then, the operator may for example move the target means 70 to the right in FIG. 1 so that the site 74 is at the opposite end of the top, horizontal line. When such a position is reached, the operator may then actuate the joystick in the direction of the arrow 82 while simultaneously depressing the thumb button for actuating the stylus and the tractor means 44 will then move from its previous position to the new position corresponding to the new siting point under the cross hairs site 74. As soon as the tractor means has reached the proper position, it will be automatically stopped and latched in place as aforesaid.

Alternatively, the operator could have moved the new siting point to the bottom of the vertical line in FIG. 1 and thereafter operated the joystick control in the direction of the arrow 84 with the thumb switch depressed whereby the tractor means 30 will move downwardly and carry with it the track and the other tractor means so as to scribe a vertical line downwardly to the new siting point. In either case, returning for example in a direction the position of the original siting point shown in FIG. 1 will cause the corresponding tractor means to be slaved to move back toward and slightly past its original position. To reorient the stylus in the proper position, the joystick control is momentarily operated in the proper direction. Obviously, a suitable indicating means such as a light may be utilized in each instance to indicate that the tractor means in each case has reached its proper position.

What is claimed is:

1. A machine for scribing lines according to a desired pattern, comprising in combination:
   a frame including a lower table and an upper table;
   means for supporting a pattern on said upper table in predetermined fixed relation thereto;
   means for supporting a member to be scribed on said lower table in predetermined fixed relation thereto;
   first and second carriage means mounted on said frame for mutually orthogonal rectinlinear movement thereon; said first carriage means including a first guide member projecting therefrom perpendicular to the direction of movement of such first carriage means and in overlying relation to said upper table, said second carriage means including a second guide member projecting therefrom perpendicular to the direction of movement of such second carriage means and in overlying relation to said upper table;
   manually movable means for positioning said first and second carriage means in selected positions with respect to said pattern, said manually movable means slidably engaging both said first and said second guide members and including a point-indicating member adapted to be aligned with a desired point on said pattern;
   first tractor means for rectilinear movement on said frame along a path parallel to the direction of movement of said first carriage means, said first tractor means including reversible drive means for effecting movement back and forth along said path and a track member projecting perpendicular to said path in overlying relation to said lower table;
   second tractor means for rectilinear movement on said track member parallel to the direction of movement of said second carriage means, said second tractor means including reversible drive means for effecting movement back and forth along said track member;
   stylus means carried by said second tractor means for selected engagement with said member to be scribed;
   first manual control means for causing the drive means of said first tractor means to position said first tractor means in predetermined relation to said first carriage means and second manual control means for causing the drive means of said second tractor means to position said second tractor means in predetermined relation to said second carriage means, whereby said stylus means is aligned with the member to be scribed in accord with a selected point on the pattern; and
   third manual control means for engaging said stylus means with the member to be scribed during actuation of either said first or said second manual control means.

2. A machine as defined in claim 1 including control means for automatically actuating the drive means of said first and said second tractor means to cause said stylus means always to follow said first and second carriage means in one direction of movement each thereof.

3. A machine as defined in claim 2 wherein said first and said second manual control means are effective to move said first and said second tractor means only in those directions opposite to said one direction of said first and said second carriage means.

4. A machine as defined in claim 3 including a first toothed latch bar paralleling the direction of movement of said first tractor means, said first tractor means including latch means for selectively engaging said first latch bar and switch means engageable with said first carriage means for actuating said latch means; and including a second toothed latch bar carried by said track member and paralleling the direction of movement of said second tractor means, said second tractor means including second latch means for selectively engaging said second latch bar and switch means engageable with said second carriage means for actuating said second latch means.

5. A machine as defined in claim 4 wherein each latch bar is provided with a plurality of sets of teeth of different pitch corresponding to different line spacings on a pattern, and means for selectively presenting any of said sets of teeth for engagement by the respective latch means.

6. A machine as defined in claim 5 including switch means on each tractor means for slowing a respective drive means when same is in the vicinity of a respective carriage means.

7. A machine for scribing lines in preparation of a pointing plate in accord with a master pattern, comprising in combination:
- an upper table for receiving a master pattern;
- a lower table for receiving a printing plate in preparation;
- a pair of movable guide means having orthogonally crossing portions overlying said upper table;
- targeting means slidably engaging said crossing portions of said pair of guide means for shifting the crossing point thereof to different positions corresponding to selected points on the master pattern, said targeting means including a sight for successive alignment with said selected points;
- first tractor means for movement back and forth along one path parallel to one of said crossing portions and including a track overlying said lower table and extending parallel to the other crossing portion;
- second tractor means for movement back and forth along said track;
- stylus means carried by said second tractor means for movement into and out of engagement with the printing plate being prepared;
- manually controlled switch means for selectively effecting motion of said first tractor means in one direction along said one path or motion of said second tractor means in one direction along said track whereby said stylus means may be moved separately in the said one directions to move toward and to a position corresponding to a sighting point of said targeting means; and
- automatic switch means on said first and second tractor means and engagable with said crossing portions of (1) automatically moving said first and second tractor means in directions opposite to said one directions in response to movement of either guide means in such respective opposite direction which tends to move the sighting point relative to the corresponding stylus position point in such opposite direction and (2) automatically stopping each tractor means as it moves in a corresponding one direction under control of said manually controlled switch means when said stylus means reaches that coordinate position corresponding to said sighting point.

* * * * *